No. 715,761. Patented Dec. 16, 1902.
F. DAILEY.
HAY OR FODDER FORK.
(Application filed Mar. 10, 1902.)
(No Model.)
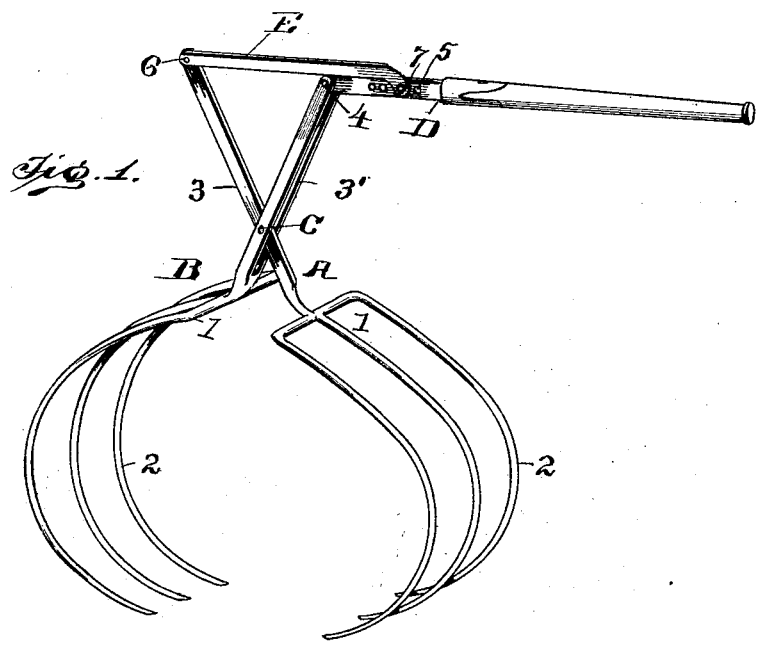
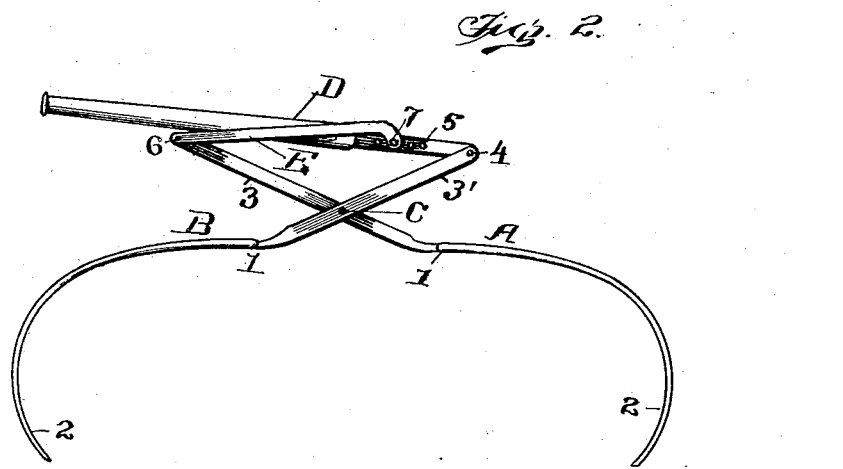
Witnesses
L. G. Handy
Edward H. Young
Inventor
Frank Dailey,
By Jas. Hunter
Attorney

UNITED STATES PATENT OFFICE.

FRANK DAILEY, OF PORT BYRON, ILLINOIS.

HAY OR FODDER FORK.

SPECIFICATION forming part of Letters Patent No. 715,761, dated December 16, 1902.

Application filed March 10, 1902. Serial No. 97,536. (No model.)

*To all whom it may concern:*

Be it known that I, FRANK DAILEY, a citizen of the United States, residing at Port Byron, in the county of Rock Island and State of Illinois, have invented certain new and useful Improvements in Hay or Fodder Forks; and I do hereby declare the following to be a full, clear, and exact description of the invention, such as will enable others skilled in the art to which it appertains to make and use the same.

My invention relates to forks for agricultural purposes; and it consists in the improvements in construction and arrangement hereinafter described, and pointed out in the claims.

In the drawings, Figure 1 is a perspective view of my fork in closed position. Fig. 2 is an end elevation of the same in extended or open position.

In the drawings, A and B indicate, respectively, two grasping or fork members pivotally united at C.

D is a handle connected to one of the fork members, and E a link connection between the opposite fork member and the handle.

The fork members each comprise a fork proper, 1, having a suitable number of curved tines 2 of usual construction and an arm extending upward therefrom. The arms are preferably crossed and pivoted at C, arm 3 of member A being preferably solid, while arm 3' of member B is preferably bifurcated, as shown in Fig. 1, to receive arm 3 and form a guide therefor.

The handle D is pivotally connected, as at 4, to the free end of one of the arms, preferably the bifurcated arm 3', and is preferably provided with a series of apertures 5 at a suitable distance from said pivot-point. The link E is connected to the free end of the opposite arm A by a pivot 6 and to the handle D by a bolt or equivalent connection 7, taking through one of the apertures 5 therein. I prefer to form the end of the link adjacent to the handle D with a curve 8 to enable said link to overlie and rest upon the extreme end of the arm 3' when the parts are in the position shown in Fig. 1, with the pivotal points 4, 6, and 7 in substantially horizontal alinement.

The operation of the device is as follows: The fork being in the open position of Fig. 2, the foot may be placed upon the tines of fork member A to steady it and the handle drawn toward the right of said figure until the link E comes in contact with the top of arm 3', which forms a stop to prevent further movement in that direction, when the parts will have assumed the closed position of Fig. 1, grasping when in use a load of fodder or the like. The fork and its load may now be lifted outright for transportation, the handle being held in a horizontal or vertically-inclined position, whereby the weight of the fork member and the load tending to bring the mass to a position, with its gravitational center in vertical alinement with the pivot-point 4, will cause the link E to bear firmly upon the end of arm 3' and securely lock the fork in closed position. To release the load, the fork members may be lowered until the handle is vertically disposed, such movement permitting a partial opening of the fork members sufficient to permit the escape of the material therein held, as will be readily understood. Further movement of the handle beyond the perpendicular will result in the fork again assuming the open position of Fig. 2.

The reach of the tines may be varied by the adjustment of the connection 7 to different holes 5 of the series provided in the handle, as shown.

While I have herein described the preferred construction of my improved fork, I do not intend to limit myself to the exact construction shown, as many changes may be made without departing from the spirit of my invention.

What I therefore claim, and desire to secure by Letters Patent, is—

1. In a fork of the character described, the combination of a pair of grasping members pivotally connected intermediate their ends, a handle pivotally connected to the end of one of said grasping members, and a link pivotally connected to the other of said members and to the handle, said link being longer than the distance intermediate the point of its pivotal connection with the handle and the pivoted end of said handle; substantially as described.

2. In a fodder-fork, the combination with a pair of fork members having arms extending therefrom, said arms being crossed and pivotally connected at the point of intersection, a handle pivotally connected to one of said arms, a link pivotally secured to the handle of greater length than the distance intermediate said point of connection and the pivoted end of the handle, said link being secured at its other end to the end of the second fork-arm, whereby the handle may be moved beyond its pivoted point in one direction, and a stop for limiting the movement of the handle in one direction; substantially as described.

3. In a fodder-fork, the combination with the crossed fork members A and B, of a handle D pivoted to the fork member B, and a curved link E pivotally connected to the handle D and the fork member A and arranged, when the fork is in open position, to overlie the end of the fork member B; substantially as described.

4. In a fork of the character described, the combination with the fork members A, B, pivoted at C, of a handle D, pivoted to the member B and provided with a series of perforations 5, a link E, pivoted to member A and provided with a bolt 7 adapted for connection with one of the perforations, substantially as described.

In testimony whereof I affix my signature in presence of two witnesses.

FRANK DAILEY.

Witnesses:
B. B. HUNTLEY,
JOHN SCHAFER.